Jan. 8, 1924.
F. MASHEK
1,480,406
AUTOMOBILE ATTACHMENT
Filed Oct. 13, 1922
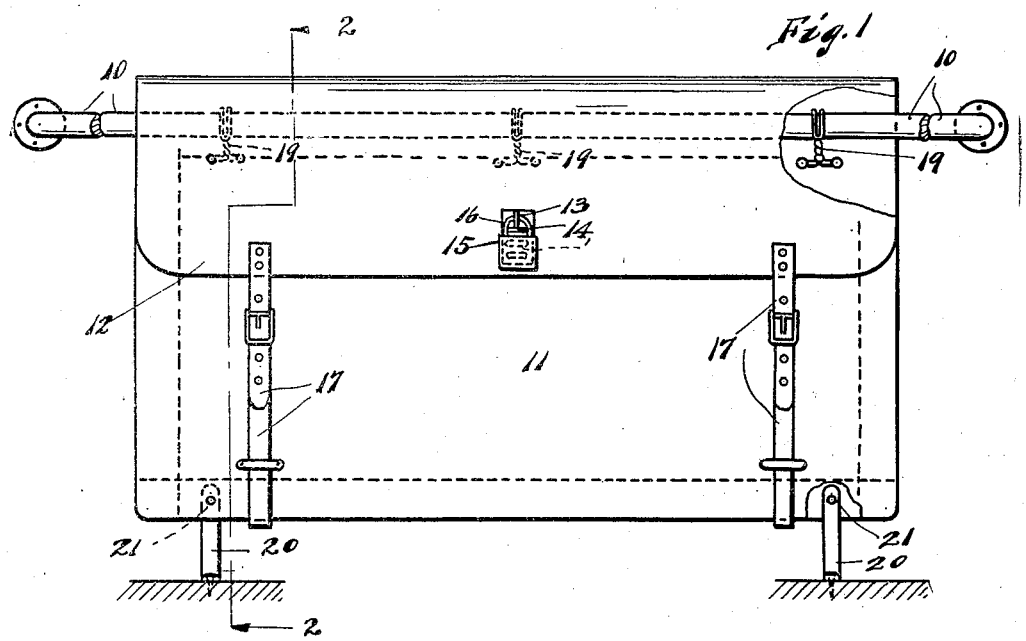
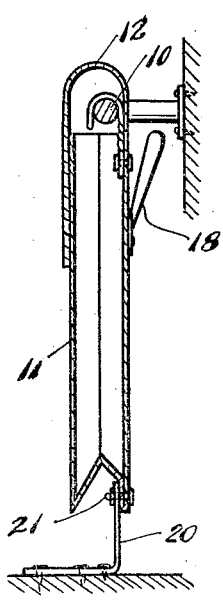
Witnesses
Inventor
Frank Mashek
By Joshua R. H. Potts
His Attorney Patented Jan. 8, 1924.

1,480,406

UNITED STATES PATENT OFFICE.

FRANK MASHEK, OF CHICAGO, ILLINOIS.

AUTOMOBILE ATTACHMENT.

Application filed October 13, 1922. Serial No. 594,348.

*To all whom it may concern:*

Be it known that I, FRANK MASHEK, a citizen of the United States, and a resident of the city of Chicago, county of Cook, and State of Illinois, have invented certain new and useful Improvements in Automobile Attachments, of which the following is a specification.

This invention relates to automobile attachments, and more particularly to a carrying case adapted to be attached to the rug supporting, or similar, member, ordinarily provided in automobiles, such case having a cover looped over said member and fastened to said case by suitable locking means.

Another object of the invention is to provide means for securing the case upon the supporting member independently of the cover, together with means for detachably securing the bottom portion of said case to the automobile to prevent movement thereof.

A further object of the invention is to provide a distensible case of the type commonly known as "brief cases" in the situation above referred to, such case when detached from the automobile being to all intents and purposes an ordinary brief case, and capable of similar use.

Other objects will appear hereinafter.

The invention consists in the combinations and arrangements of parts hereinafter described and claimed.

The invention will be best understood by reference to the accompanying drawings forming a part of this specification, and in which, Fig. 1, is a front elevation of the invention showing a supporting bar of the type usually provided on the rear side of the forward seat of an automobile, together with the case applied thereon, portions of such case being broken away to expose the fastening means used in connection therewith, and Fig. 2, is a sectional view on the line 2—2 of Fig. 1.

Referring to the drawings 10 represents a supporting bar of the type ordinarily provided upon the rear side of the forward seat of an automobile, though it is obvious that any other similar support in whatever situation, may be utilized without departing from the scope of the invention. A distensible carrying case, of the type commonly known as a "brief case" having a body portion 11, and a flap or cover 12 is adapted to be disposed adjacent the supporting bar 10 or supporting member and have the cover 12 looped thereover, the body 11 being provided with a rotatable lug 13 adapted to be selectively engaged with any one of a plurality of slots 14 in the cover 12, turning of the lug 13 crosswise of said slots securing the cover to the body portion and the case to the support. A lock 15 having a locking member 16 may be engaged with an aperture in the lug 13, so as to securely lock the cover to the body, and the case to the supporting member 10. The body 11 and cover 12 are also preferably provided with straps 17 such as those illustrated in the drawings. A handle 18 is fastened on the side of the body portion 11 instead of on the top of the cover 12 as in the ordinary construction, the handle 18 being so placed so that the same will not interfere with rugs or articles of clothing disposed over the case when the same is in position on the supporting member.

In order to support the case upon the supporting member 10 independently of the cover 12 I preferably provide securing means within the case, adjacent the cover thereof, which securing means may be in the form of hooks 19 adapted to be hooked over the supporting member 10, so as to support the case in position, and permit independent operation of the cover 12. Preferably mounted adjacent the lower portion of the case is a pair of straps 20 which may have their inner ends detachably fastened to the body 11 of the case by any suitable means such as snap fasteners 21.

By this arrangement it will be apparent that a carrying case, substantially in the form of a brief case, may be placed in position upon the automobile by looping the flap thereof over a suitable supporting member and locking the flap to the body portion of the case, thus not only locking the case, but locking the case to the automobile. In addition means are provided for supporting the case independently of the cover, so that the cover may be operated to open the case without removing the same from its position on the supporting member. It will be noticed that the case in position on the supporting member 10 in no way interferes with the normal function of such supporting member as rugs or articles of clothing may be disposed over the case in the same way they would be disposed over the supporting member if the case were not present. When the case is removed from its position on the supporting member it may be carried about in the same manner as an ordinary brief case, or travelling bag.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention, what I claim as new and desire to secure by Letters Patent is:

1. A case having means for securing the same on a supporting rod, said means consisting of hooks disposed and fixed on the inside of said case, the cover of said case being looped over said supporting rod and secured to said case; and means for locking said cover to said case and thereby lock said case on said rod.

2. A distensible case having means for securing the same on the rug supporting member of an automobile, said means consisting of hooks fastened to the inside of said case, the cover of said case being looped over said supporting member and secured to said case; means for locking said cover to said case and member; and means including straps with fasteners for detachably confining the bottom portion of said case against movement.

3. The combination with the rug supporting rod of an automobile; of a case comprising hooks fastened on the inside thereof and having rounded engaging ends for securing the same on said supporting rod, the cover of said case being looped over said supporting rod and locked in position on said case; and means including straps with fasteners for detachably retaining the bottom portion of said case against movement.

In testimony whereof I have signed my name to this specification in the presence of two subscribing witnesses.

FRANK MASHEK.

Witnesses:
JOSHUA R. H. POTTS,
FREDA C. APPLETON.